US012210246B2

(12) United States Patent
Wu et al.

(10) Patent No.: US 12,210,246 B2
(45) Date of Patent: Jan. 28, 2025

(54) ARRAY SUBSTRATE, OPPOSITE SUBSTRATE, AND DISPLAY PANEL

(71) Applicants: Beijing BOE Optoelectronics Technology Co., Ltd., Beijing (CN); BOE Technology Group Co., Ltd., Beijing (CN)

(72) Inventors: Xiaojuan Wu, Beijing (CN); Jiaxing Wang, Beijing (CN); Xuan Zhong, Beijing (CN); Hongliang Yuan, Beijing (CN); Yao Bi, Beijing (CN); Jinshuai Duan, Beijing (CN); Feng Qu, Beijing (CN); Xinxin Zhao, Beijing (CN); Jian Wang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/770,820

(22) PCT Filed: May 21, 2021

(86) PCT No.: PCT/CN2021/095163
§ 371 (c)(1),
(2) Date: Apr. 21, 2022

(87) PCT Pub. No.: WO2022/241763
PCT Pub. Date: Nov. 24, 2022

(65) Prior Publication Data
US 2024/0142819 A1 May 2, 2024

(51) Int. Cl.
G02F 1/1339 (2006.01)
G02F 1/1335 (2006.01)
(Continued)

(52) U.S. Cl.
CPC ...... *G02F 1/1339* (2013.01); *G02F 1/133514* (2013.01); *G02F 1/133553* (2013.01);
(Continued)

(58) Field of Classification Search
None
See application file for complete search history.

(56) References Cited

U.S. PATENT DOCUMENTS 6,330,047 B1 * 12/2001 Kubo ................ G02F 1/133555
349/110
6,466,294 B1 * 10/2002 Yamagishi ............ G02F 1/1345
430/7

(Continued)

FOREIGN PATENT DOCUMENTS

| CN | 1284707 A | 2/2001 |
| CN | 1417622 A | 5/2003 |

(Continued)

*Primary Examiner* — Shan Liu
(74) *Attorney, Agent, or Firm* — IPro, PLLC

(57) ABSTRACT

An array substrate, an opposite substrate and a display panel are provided. The array substrate comprises: a display region and a periphery region surrounding the display region, wherein the display region comprises a plurality of pixel regions, and each of the pixel regions comprises a reflective region and a transmissive region; the reflective region comprises a driving signal outputting layer, a segment gap layer, a passivation layer and a reflective layer, the reflective layer is coupled to the driving signal outputting layer to enable both the reflective layer and the driving signal outputting layer to function as a reflective region driving electrode; the transmissive region comprises a first electrode layer, the first electrode layer is coupled to the driving signal outputting layer, the passivation layer extends to the transmissive region, and the passivation layer is arranged between the first electrode layer and a first base of the display substrate.

12 Claims, 3 Drawing Sheets

(51) Int. Cl.
*G02F 1/1337* (2006.01)
*G02F 1/1368* (2006.01)

(52) U.S. Cl.
CPC .......... *G02F 1/1337* (2013.01); *G02F 1/1368* (2013.01); *G02F 2203/09* (2013.01)

(56) References Cited

U.S. PATENT DOCUMENTS

| | | | |
|---|---|---|---|
| 7,088,418 B1 | 8/2006 | Yamashita et al. | |
| 2003/0081159 A1 | 5/2003 | Ha et al. | |
| 2003/0231267 A1* | 12/2003 | Murai | G02F 1/133555 349/113 |
| 2004/0012738 A1* | 1/2004 | Murai | G02F 1/13394 349/114 |
| 2004/0085273 A1 | 5/2004 | Kikuchi et al. | |
| 2004/0207784 A1* | 10/2004 | Lim | G02F 1/136227 349/114 |
| 2005/0174517 A1 | 8/2005 | Kim et al. | |
| 2005/0270450 A1 | 12/2005 | Ahn et al. | |
| 2006/0187389 A1 | 8/2006 | Nakayama et al. | |
| 2009/0066903 A1* | 3/2009 | Yoshida | G02F 1/1339 445/25 |
| 2011/0090445 A1* | 4/2011 | Kim | G02F 1/1339 349/139 |
| 2019/0265536 A1 | 8/2019 | Cao et al. | |
| 2022/0297603 A1* | 9/2022 | Li | B60R 1/088 |
| 2023/0236449 A1* | 7/2023 | He | G02F 1/1347 349/74 |

FOREIGN PATENT DOCUMENTS

| | | |
|---|---|---|
| CN | 1499254 A | 5/2004 |
| CN | 1673843 A | 9/2005 |
| CN | 1707338 A | 12/2005 |
| CN | 1825177 A | 8/2006 |
| CN | 101427292 A | 5/2009 |
| CN | 102654674 A | 9/2012 |
| CN | 203688942 U | 7/2014 |
| CN | 105892166 A | 8/2016 |
| CN | 106154652 A | 11/2016 |
| CN | 205787482 U | 12/2016 |
| CN | 107357091 A | 11/2017 |
| CN | 109061953 A | 12/2018 |
| CN | 109427819 A | 3/2019 |
| CN | 109828405 A | 5/2019 |
| CN | 209248208 U | 8/2019 |
| CN | 209842296 U | 12/2019 |
| CN | 110967861 A | 4/2020 |
| KR | 100744401 B1 * | 7/2007 |

* cited by examiner

ARRAY SUBSTRATE, OPPOSITE SUBSTRATE, AND DISPLAY PANEL

CROSS-REFERENCE TO RELATED APPLICATION

This application is the U.S. national phase of PCT Application No. PCT/CN2021/095163 filed on May 21, 2021, the entire contents of which are hereby incorporated by reference.

TECHNICAL FIELD

The present disclosure relates to the technical field of displaying, and more particular to an array substrate, an opposite substrate and a display panel.

BACKGROUND

A light source of a liquid crystal display is mainly a backlight. However, the utilization of the backlight is greatly reduced due to the fact that the backlight has to pass through such element as the base and the color filter; and at outdoors with the high light intensity, the image displayed on the screen even cannot be seen at all. In order to improve the display quality both indoors and outdoors with the high light intensity, a transflective display screen has been proposed. The transflective display is generally applied to such a scenario as an outdoor wearable device, wherein the reflective mode is used in the high brightness environment, and the transmissive mode is used in the low brightness environment brightness, so as to achieve a clear display quality in different scenes.

SUMMARY

An object of the present disclosure is to provide an array substrate, an opposite substrate and a display panel.

To achieve the above object, the present disclosure provides the following technical solution.

A first aspect of the present disclosure provides an array substrate including: a display region and a periphery region surrounding the display region, wherein the display region includes a plurality of pixel regions, and each of the pixel regions includes a reflective region and a transmissive region;
  the reflective region includes a driving signal outputting layer, a segment gap layer, a passivation layer and a reflective layer, the reflective layer is coupled to the driving signal outputting layer to enable both the reflective layer and the driving signal outputting layer to function as a reflective region driving electrode;
  the transmissive region includes a first electrode layer, the first electrode layer is coupled to the driving signal outputting layer, the passivation layer extends to the transmissive region, and the passivation layer is arranged between the first electrode layer and a first base of the display substrate.

Optionally, there is a maximum segment gap d1 between a surface of the reflective layer distal to the first base and a surface of a portion of the first electrode layer distal to the first base, and the portion of the first electrode layer is arranged at the transmissive region, where 2 µm≤ d1 ≤3 µm.

Optionally, the segment gap layer includes a buffer layer and an OC layer, and the buffer layer is arranged between an OC layer and the first base.

Optionally, the array substrate further includes a driving electrode arranged in the reflective region, and the reflective layer further functions as the driving electrode.

Optionally, the reflective region further includes a gate metal layer, a gate insulation layer and an active layer; the gate metal layer, the gate insulation layer and the active layer are laminated on one on another in a direction away from the first base, the driving signal outputting layer is arranged at a side of the active layer distal to the first base; the gate metal layer, the gate insulation layer, the active layer and the driving signal outputting layer are capable of forming a thin-film transistor, the driving signal outputting layer functions as an output electrode of the thin-film transistor;
  the gate insulation layer extends to the transmissive region and the periphery region;
  the passivation layer extends to the periphery region.

Optionally, the periphery region includes:
  a common signal outputting layer and a common signal transmission layer that are coupled to each other;
  the common signal outputting layer is arranged at a side of the passivation layer distal to the first base, and the common signal transmission layer is arranged between the passivation layer and the first base.

Optionally, the common signal outputting layer and the first electrode layer are arranged at a same layer and made of a same material, and the common signal transmission layer and the gate metal layer are arranged at a same layer and made of a same material.

A second aspect of the present disclosure provides a display region and a periphery region surrounding the display region, wherein the opposite substrate further includes a second base, a color resist layer, a common electrode, and a wall structure, wherein the color resist layer, the common electrode, and the wall structure are arranged on the color resist layer;
  wherein both the color resist layer and the common electrode are capable of extending from the display region to the periphery region; and
  the wall structure is arranged in the periphery region, and the wall structure includes an inner wall pattern and an outer wall pattern, the inner wall pattern is arranged between the display region and the outer wall pattern, the inner wall pattern and the outer wall pattern are at least partially staggered to form a passage from the display region to a side of the wall structure distal to the display region.

Optionally, the periphery region includes a corner region and a straight region;
  the inner wall pattern includes a first corner wall pattern and a first straight wall pattern;
  the outer wall pattern includes a second corner wall pattern and a second straight wall pattern; and
  in at least one straight region, the first straight wall pattern and the second straight wall pattern are arranged alternately in an extension direction of the straight region.

Optionally, in a same straight region, an orthographic projection of the first straight wall pattern in a first direction partially overlaps an orthographic projection of the second straight wall pattern in the first direction partially overlap, and the first direction is parallel to an extension direction of the first straight wall pattern and an extension direction of the second straight wall pattern.

Optionally, in the same straight region, there is an overlapped portion of the orthographic projection of the first straight wall pattern in the first direction and the orthographic projection of the second straight wall pattern in the first direction, and a length a1 of the overlapped portion satisfies: 18 μm≤a1≤25 μm;

in an extension direction parallel to the first straight wall pattern, a length a2 of the first straight wall pattern satisfies: 480 μm≤a2≤520 μm;

in an extension direction parallel to the second straight wall pattern, a length a2 of the second straight wall pattern satisfies: 480 μm≤a3≤520 μm;

in an extension direction parallel to the first straight wall pattern, a distance a4 between the adjacent first straight wall patterns satisfies: 440 μm≤a4≤480 μm;

in an extension direction parallel to the second straight wall pattern, a distance a5 between the adjacent second straight wall patterns satisfies: 440 μm≤a5≤480 μm;

a minimum distance a6 between the first corner wall pattern and the display region satisfies: 50 μm≤a6≤350 μm;

in a direction perpendicular to the first direction, a distance a7 between a border of the first straight wall pattern proximate to the display region and a border of the second straight wall pattern distal to the display region satisfies: 40 μm≤a7≤60 μm;

in a same corner region, an extension direction of the first corner wall pattern and an extension direction of the second corner wall pattern are same; and in an extension direction perpendicular to the first corner wall pattern, a distance a8 between a border of the first corner wall pattern proximate to the display region and a border of the second corner wall pattern distal to the display region satisfies: 40 μm≤a8≤60 μm; and the second corner wall pattern is adjacent to the first straight region and the second straight region, a first end of the second corner wall pattern is proximate to the first straight region, and a second end of the second corner wall pattern is proximate to the second straight region; a distance a9 between the first end and a border of the second straight region distal to the display region satisfies: 3 mm≤a9≤3.4 mm; a distance a10 between the second end and the first straight region distal to a border of the display region satisfies: 2.8 mm≤a10≤3.2 mm.

Based on the technical solution of the above-mentioned array substrate and the technical solution of the above-mentioned opposite substrate, a third aspect of the present disclosure provides a display panel including the above-mentioned array substrate and the above-mentioned opposite substrate, the array substrate is arranged opposite to the opposite substrate, the display panel further includes:

a liquid crystal layer arranged between the array substrate and the opposite substrate; and a sealant configured for bonding the periphery region of the array substrate with the periphery region of the opposite substrate, and the sealant surrounding the wall structure in the opposite substrate.

Optionally, in the reflective region, a distance d2 between the opposite substrate and the array substrate satisfies: 2 μm≤d2≤2.4 μm; and in the transmissive region, a distance d3 between the opposite substrate and the array substrate satisfies: 4.4 μm≤d3≤5 μm.

Optionally, the display panel further includes a conductive connection part and a supporting part, at least a portion of the conductive connection part and at least a portion of the supporting part are both within the sealant, and the conductive connection part are coupled to both the common electrode in the opposite substrate and the common signal outputting layer in the array substrate.

Optionally, a distance between the common electrode in the opposite substrate and the common signal outputting layer in the array substrate is greater than or equal to a size of the supporting part.

Optionally, the liquid crystal layer includes cholesteric liquid crystals with an achiral agent; and a side of the array substrate proximate to the opposite substrate is provided with a first alignment layer, a side of the opposite substrate proximate to the array substrate is provided with a second alignment layer, and an alignment direction of the first alignment layer is anti-parallel to an alignment direction of the second alignment layer.

BRIEF DESCRIPTION OF THE DRAWINGS

The accompanying drawings described herein are used to provide a further understanding of the present disclosure and constitute a portion of the present disclosure. The exemplary embodiments of the present disclosure and the description thereof are used to explain the present disclosure and do not constitute an improper limitation on the present disclosure. In the drawings.

DETAILED DESCRIPTION

To further illustrate the array substrate, the opposite substrate and the display panel provided by embodiment of the present disclosure, the following detailed description is made with reference to the accompanying drawings.

In the related art, a transflective display is usually limited in its application due to its reflectivity, transmittance, and contrast. Therefore, how to improve the reflectivity, transmittance and contrast of the transflective display screen to improve the application of range of the transflective display screen has become an urgent problem to be solved.

Figure 1:
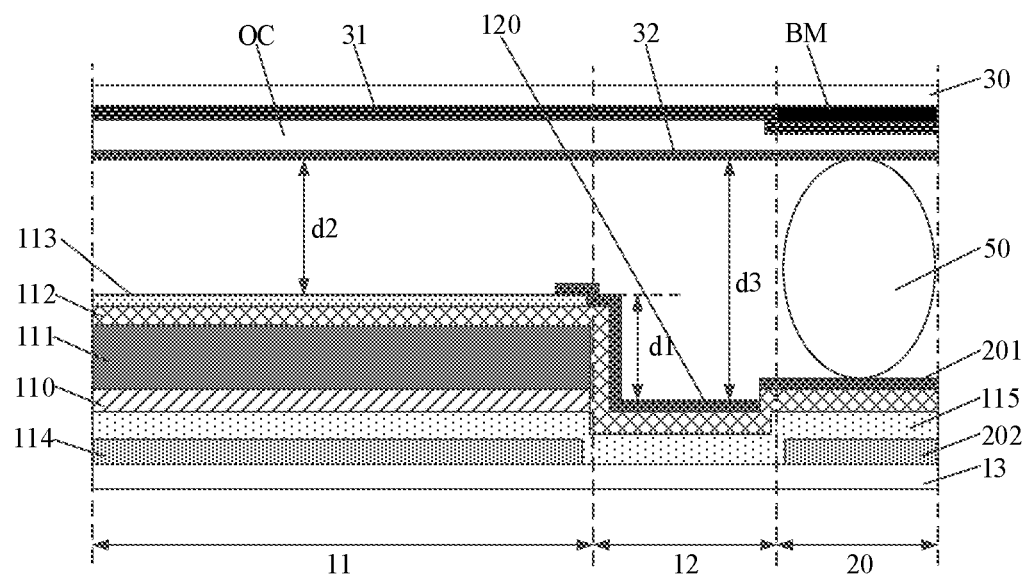
FIG. 1 is a cross-sectional view of a display panel at a pixel region and a periphery region according to an embodiment of the present disclosure.
Figure 2:
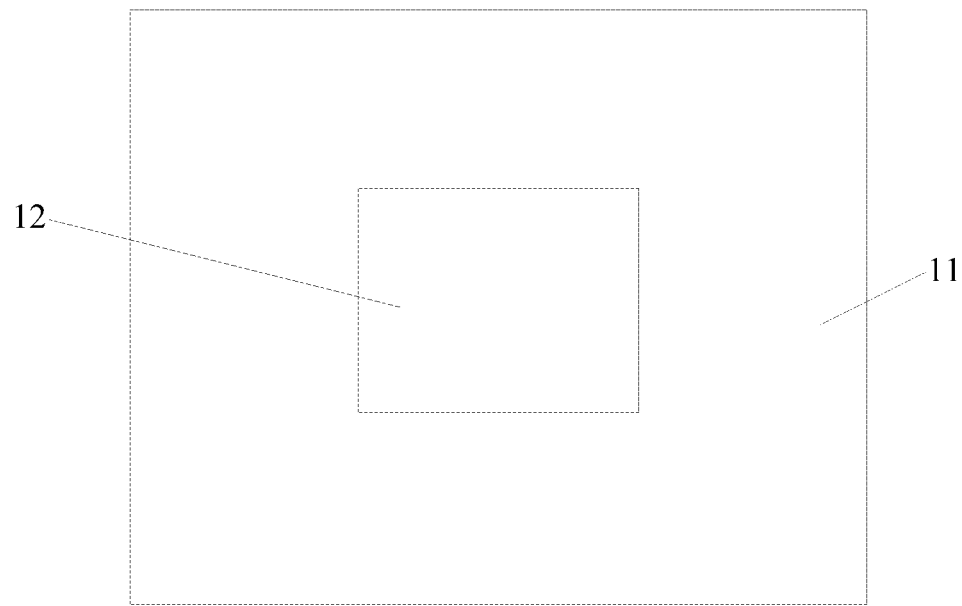
FIG. 2 is a schematic top view of the pixel region according to an embodiment of the present disclosure.
Figure 5:
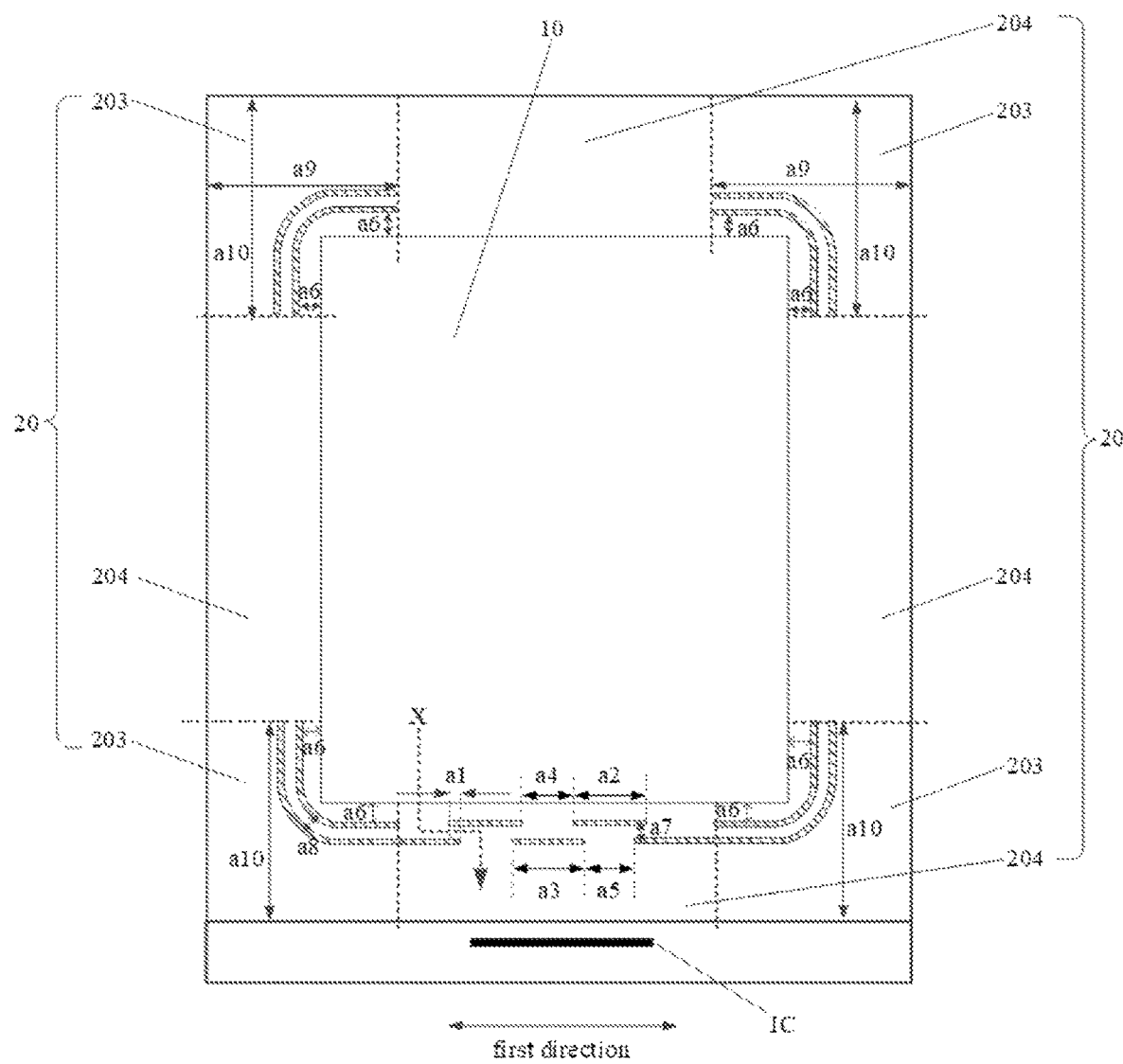
FIG. 5 is a schematic layout view of the wall structure in a display panel according to an embodiment of the present disclosure.

Referring to FIGS. 1, 2 and 5, the embodiments of the present disclosure provide an array substrate including: a display region 10 and a periphery region 20 arranged at the periphery of the display region 10; the display region 10 includes a plurality of pixel regions, and the pixel region includes a reflective region 11 and a transmissive region 12;

the reflective region 11 includes: a driving signal outputting layer 110, a segment gap layer 111, a passivation layer 112, and a reflective layer 113; the reflective layer 113 is coupled to the driving signal outputting layer 110; thus reflective layer 113 also functions as a reflective region driving electrode.

The transmissive region 12 includes: a first electrode layer 120, wherein the first electrode layer 120 is coupled to the reflective layer 113, thereby being coupled to the driving signal outputting layer 110; the passivation layer 112 extends to the transmissive region 12, the passivation layer 112 being arranged between the first electrode layer 120 and the first base 13 of the display substrate.

For example, a driving signal outputting layer 110, a segment gap layer 111, a passivation layer 112, and a reflective layer 113 are sequentially laminated on the first base 13 in a direction away from the first base 13.

For example, the array substrate includes a display region 10 and a periphery region 20 surrounding the display region 10, the display region 10 including a rectangle, and the periphery region 20 including four corner regions and straight regions arranged between adjacent corner regions.

For example, the display region 10 includes a plurality of pixel regions arranged in an array, each pixel region including the reflective region 11 and the transmissive region 12. For example, in one pixel region, the reflective region 11 surrounds the transmissive region 12.

For example, the array substrate includes a first base 13, and a driving signal outputting layer 110, a segment gap layer 111, a passivation layer 112 and a reflective layer 113 sequentially laminated on the first base 13 in a direction away from the first base 13; the driving signal outputting layer 110, the segment gap layer 111, the reflective layer 113 and a portion of the passivation layer 112 is arranged at the reflective region 11; the passivation layer 112 also includes portions at the transmissive region 12 and the periphery region 20, and the passivation layer 112 includes an entire layer structure covering the array substrate.

For example, the array substrate includes a source/drain metal layer, and the source/drain metal layer is used to form the driving signal outputting layer 110. For example, the array substrate includes a thin-film transistor in the reflective region 11, the driving signal outputting layer 110 serves as an output electrode of the thin-film transistor, or the driving signal outputting layer 110 is coupled to an output electrode of the thin-film transistor.

For example, the segment gap layer 111 is arranged on the reflective region 11, and the thicknesses of the segment gap layer 111 in the direction perpendicular to the first base 13 may be controlled, so as to control the segment gap between the reflective region 11 and the transmissive region 12.

For example, the reflective layer 113 is made of a metal material such as Al, Ag, etc. For example, the array substrate further includes a driving electrode arranged in the reflective region 11, and the reflective layer 113 further serves as the driving electrode of the reflective region 11; that is, in addition to reflecting the light, the reflective layer 113 is further used for driving the liquid crystal molecules of the liquid crystal layer under the control of the driving signal. The reflective layer 113 is coupled to the driving signal transmission layer through a via hole penetrating through the passivation layer 112 and the segment gap layer 111, so as to receive the driving signal provided by the driving signal transmission layer.

For example, the first electrode layer 120 is made of Indium Tin Oxide (ITO) material. The first electrode layer 120 includes a portion arranged at the transmissive region 12, a portion arranged at the reflective region 11, and a portion configured for climbing the segment gap between the reflective region 11 and the transmissive region 12. The portion of the first electrode layer 120 arranged at the reflective region 11 is lapped onto the reflective layer 113 at a position where the reflective layer 113 is arranged between the first electrode layer 120 and the first base 13. The first electrode layer 120 has the same electrical signal as the reflective layer 113 to which it is lapped onto.

According to the specific structure of the above-mentioned array substrate, it can be seen that in the array substrate provided by the embodiments of the present disclosure, the segment gap layer 111 is arranged at the reflective region 11, and the segment gap of the array substrate at the reflective region 11 and the transmissive region 12 can be controlled by controlling the thicknesses of the segment gap layer 111. In this way, when the array substrate and the opposite substrate are aligned to form a display panel, it is possible to implement that there is a significant difference between the cell thickness of the reflective region 11 and the cell thickness of the transmissive region 12 in the display panel, so that it is able achieve an optimal matching between the cell thickness of the display panel at the reflective region 11 and the cell thickness of the display panel at the transmissive region 12, and thus it enables the display panel to achieve a high reflectivity, a high transmittance and a high contrast, which effectively improve the application range of the display panel with the transflective function.

Furthermore, in the array substrate provided by the embodiments of the present disclosure, the thicknesses of the segment gap layer 111 may be controlled, so as to control the segment gap of the array substrate in the reflective region 11 and the periphery region 20. As a result, when the array substrate and the opposite substrate are aligned to form the display panel, the cell thickness of the display panel in the periphery region 20 can be better controlled, so that the cell thickness of the display panel in the periphery region 20 can better match the supporting part (e.g., spherical silicon) arranged in the sealant in the periphery region 20 to prevent the defect of the moire pattern from occurring in the periphery region 20 in a better manner.

In addition, the passivation layer 112 is provided between the reflective layer 113 and the segment gap layer 111, so as to improve the adhesiveness of the reflective layer 113 on the array substrate and effectively prevent the reflective layer 113 from falling off the array substrate.

As shown in FIG. 1, in some embodiments of the present disclosure, the maximum segment gap d1 between the surface of the reflective layer 113 distal to the first base 13 and the surface of the portion of the first electrode layer 120 arranged at the transmissive region 12 distal to the first base 13 satisfies: $2\ \mu m \le d1 \le 3\ \mu m$.

For example, the maximum segment gap d1 between the surface of the reflective layer 113 distal to the first base 13 and the surface of the portion of the first electrode layer 120 arranged at the transmissive region 12 distal to the first base 13 may be of the value of 2.2 μm, 2.4 μm, 2.6 μm, 2.8 μm, etc.

For example, when the array substrate and the opposite substrate are aligned to form the display panel, the difference between the cell thickness of the reflective region 11 and the cell thickness of the transmissive region 12 in the display panel is between 2 μm and 3 μm, inclusive.

For example, when the array substrate and the opposite substrate are aligned to form the display panel, the difference value of the display panel between the cell thickness of the reflective region 11 and the cell thickness of the transmissive region 12 may be of the value of 2.2 μm, 2.4 μm, 2.6 μm, 2.8 μm, etc.

In the array substrate provided by the embodiments of the present disclosure, d1 is set to satisfy: $2\ \mu m \le d1 \le 3\ \mu m$, such that when the array substrate and the opposite substrate are aligned to form the display panel, the difference between the cell thickness of the display panel at the reflective region 11 and the cell thickness at the transmissive region 12 can be controlled to be between 2 μm and 3 μm, such that there is a significant difference between the cell thickness at the reflective region 11 and the cell thickness at the transmissive region 12 in the display panel, thereby enabling an optimal matching of the cell thickness of the display panel at the reflective region 11 and the cell thickness of the display panel at the transmissive region 12, and enabling the display panel to realize the high reflectivity, the high transmittance and the high contrast, so as to improve the application range of the display panel with the transflective function.

In some embodiments of the present disclosure, the segment gap layer 111 includes a buffer layer and an OC layer, the buffer layer is arranged between the OC layer and the first base 13.

For example, both the buffer layer and the OC layer are made of resin material.

The above-mentioned arrangement that the segment gap layer 111 includes a buffer layer and an OC layer not only facilitates improving the overcoating effect of the OC layer, but also enables the segment gap layer 111 to realize a larger adjustment space for the segment gap.

As shown in FIG. 1, in some embodiments of the present disclosure, the reflective region 11 also includes a gate metal layer 114, a gate insulation layer 115 and an active layer (not shown in FIG. 1) which are laminated one on another in sequence in a direction away from the first base 13, and the driving signal outputting layer 110 is arranged at a side of the active layer distal to the first base 13; the gate metal layer 114, gate insulation layer 115, active layer and the driving signal outputting layer 110 can form a thin-film transistor, and the driving signal outputting layer 110 functions as an output electrode of the thin-film transistor; the gate insulation layer 115 extends to the transmissive region 12 and the periphery region 20; the passivation layer 112 extends to the periphery region 20.

For example, the gate metal layer 114 is used to form a gate electrode of the thin-film transistor. The gate insulation layer 115 can insulate the gate metal layer 114 from the active layer. The active layer is used to form a channel region of the thin-film transistor. A source/drain metal layer in the array substrate is used to form an input electrode of the thin-film transistor and the driving signal outputting layer 110, the driving signal outputting layer 110 being an output electrode of the thin-film transistor.

For example, the gate insulation layer 115 and the passivation layer 112 are both structures covering an entirety of the region of the array substrate.

For example, the thin-film transistor is coupled to a corresponding scanning line and a corresponding data line in the array substrate and can be turned on under the control of the scanning line, so as to write the data signal transmitted by the data line to the reflective layer 113 and the first electrode layer 120.

For example, the transmissive region 12 does not include the gate metal layer 114 and the source/drain metal layer, which can also increase the segment gap between the transmissive region 12 and the reflective region 11.

As shown in FIG. 1, in some embodiments of the present disclosure, the periphery region 20 includes:

a common signal outputting layer 201 and a common signal transmission layer 202 which are coupled;

wherein the common signal outputting layer 201 is arranged on the side of the passivation layer 112 distal to the first base 13, and the common signal transmission layer 202 is arranged between the passivation layer 112 and the first base 13.

For example, the common signal transmission layer 202 is coupled to a driving integrated circuit mounted on the array substrate and receives a common signal provided by the driving integrated circuit. The common signal transmission layer 202 can transmit the received common signal to the common signal outputting layer 201. After the array substrate is aligned with the opposite substrate to form the display panel, the common signal outputting layer 201 can pass through conductive structures arranged in the sealant (e.g., spherical gold) to transmit the common signal to a common electrode 32 of the opposite substrate.

For example, the common signal outputting layer 201 is coupled to the common signal transmission layer 202 through a via hole penetrating through an insulating layer, the insulating layer including at least the passivation layer 112. For example, the insulating layer includes the passivation layer 112 and the gate insulation layer 115.

For example, the common signal transmission layer 202 extends along a border of the array substrate. For example, the common signal transmission layer 202 surrounds the display region 10, two ends of the common signal transmission layer 202 form an opening at one side of the display region 10, and the two ends of the common signal transmission layer 202 are coupled to a driving integrated circuit on the side where the opening is arranged.

By providing that the common signal outputting layer 201 and the common signal transmission layer 202 both extend along the border of the array substrate, the flatness of the periphery region 20 of the array substrate is improved, thereby facilitating the bond and the seal of the display panel periphery region 20 when the array substrate is used to form the display panel.

As shown in FIG. 1, in some embodiments of the present disclosure, the common signal outputting layer 201 and the first electrode layer 120 are arranged at a same layer and made of a same material, and the common signal transmission layer 202 and the gate metal layer 114 are arranged at a same layer and made of a same material.

The common signal outputting layer 201 and the first electrode layer 120 are arranged at a same layer and made of a same material, so that the common signal outputting layer 201 and the first electrode layer 120 can be formed simultaneously in the same patterning process, which is advantageous to simplify the manufacturing process of the array substrate and reduce the manufacturing cost of the array substrate.

The common signal transmission layer 202 and the gate metal layer 114 are arranged at a same layer and made of a same material, so that the common signal transmission layer 202 and the gate metal layer 114 can be formed simultaneously in the same patterning process, which is advantageous to simplify the manufacturing process of the array substrate and reduce the manufacturing cost of the array substrate.

In some embodiments of the present disclosure, the common signal transmission layer 202 and the source/drain metal layer in the array substrate are arranged at a same layer and made of a same material.

The above-mentioned arrangement enables the common signal transmission layer 202 and the source/drain metal layer to be formed at the same time in the same patterning process, which is advantageous to simplify the manufacturing process of the array substrate and reduce the manufacturing cost of the array substrate.

Figure 4:
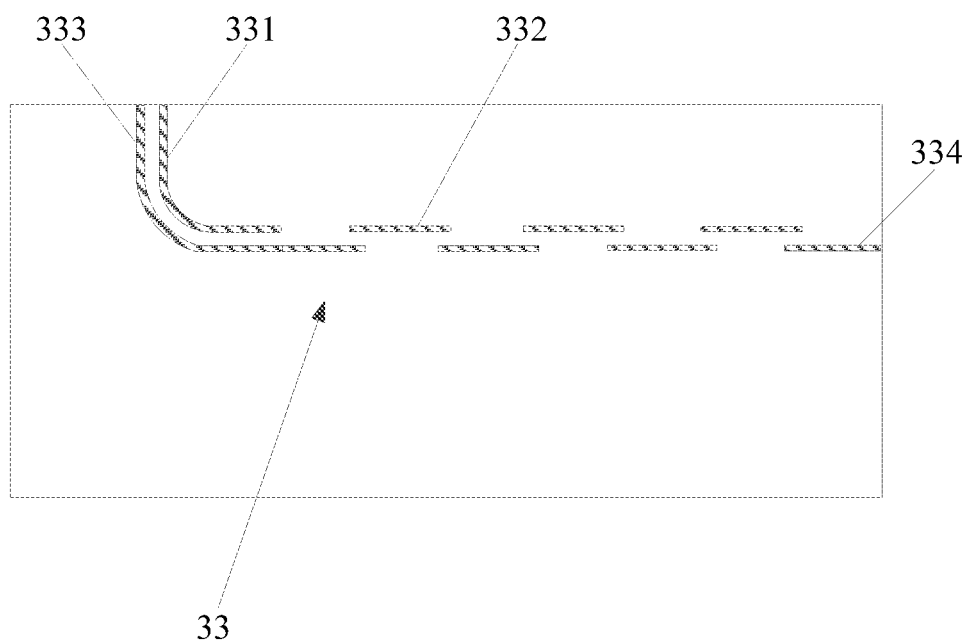
FIG. 4 is a schematic view of a portion of the wall structure according to an embodiment of the present disclosure.

As shown in FIGS. 1, 4 and 5, the embodiments of the present disclosure also provide an opposite substrate including: a display region 10 and a periphery region 20 arranged at the periphery of the display region 10, the opposite substrate further including: a second base 30, and a color resist layer 31, a common electrode 32 and a wall structure 33 that are arranged on the second base 30;

the color resist layer 31 and the common electrode 32 can both extend from the display region 10 to the periphery region 20;

the wall structure 33 is arranged in the periphery region 20, and the wall structure 33 includes: an inner wall pattern and an outer wall pattern, where the inner wall pattern is arranged between the display region 10 and the outer wall pattern, and the inner wall pattern and the outer wall pattern are at least partially staggered, so as to form a passage 10 between the display region 10 and a side of the wall structure 33 distal to the display region 10 (e.g., the passage in the direction X in FIG. 5).

For example, the color resist layer 31, the common electrode 32, and the wall structure 33 are sequentially laminated on the second base 30 in a direction away from the base.

For example, the opposite substrate includes a display region 10 and a periphery region 20 surrounding the display region 10, the display region 10 includes a rectangle, and the periphery region 20 includes four corner regions 203 and straight regions 204 each arranged between the adjacent corner region 203. The display region 10 of the opposite substrate corresponds to the display region 10 of the array substrate, and the periphery region 20 of the opposite substrate corresponds to the periphery region 20 of the array substrate.

For example, the display region 10 of the opposite substrate includes a plurality of pixel regions arranged in an array, and the pixel region included in the opposite substrate corresponds to the pixel region included in the array substrate, respectively.

For example, the color resist layer 31 includes an entire layer structure covering an entirety of the region of the opposite substrate. For example, the color resist layer 31 includes a plurality of color resist patterns. For example, the plurality of color resist patterns include a plurality of red color resist patterns, a plurality of green color resist patterns, and a plurality of blue color resist patterns. For example, the plurality of color resist patterns correspond to the plurality of pixel regions in the array substrate, respectively.

For example, the array substrate further includes a black matrix (BM), the BM being arranged between the color resist layer 31 and the second base 30. When the opposite substrate is aligned with the array substrate to form the display panel, the BM can shield the periphery region 20 of the array substrate and the non-opening region included in the pixel region in the array substrate.

For example, the opposite substrate further includes an OverCoating (OC) layer, the OC layer being arranged at a side of the color-resistive layer 31 distal to the second base 30. The OC layer is used to eliminate the segment gap produced by the color resist layer 31.

For example, the common electrode 32 is arranged at a side of the OC layer distal to the second base 30, the common electrode 32 including an entire layer structure covering an entirety of the region of the opposite substrate. For example, the common electrode 32 is made of ITO material.

For example, the opposite substrate further includes a plurality of spacers arranged in an array, the plurality of spacers being arranged at a side of the common electrode 32 distal to the second base 30. The plurality of spacers can function as a supporting part when the opposite substrate is aligned with the array substrate to form the display panel. The orthographic projection of the spacer on the first base 13 is surrounding the orthographic projection of the reflective region 11 on the first base 13. For example, the orthographic projection of the spacer on the second base 30 is covered by the orthographic projection of the BM on the second base 30.

For example, the wall structure 33 and the spacer are arranged in the same material layer and made of the same material, and the wall structure 33 can be formed in the same patterning process as the spacer.

For example, the wall structure 33 includes: an inner wall pattern and an outer wall pattern, at least a portion of the inner wall pattern is arranged between the display region 10 and the outer wall pattern. When the opposite substrate is aligned with the array substrate to form the display panel, the orthographic projection of the wall structure 33 on the second base 30 is arranged between the display region 10 and the sealant.

For example, in an extension direction of a border of the opposite substrate, the inner wall pattern and the outer wall pattern are at least partially staggered.

It should be noted that the opposite substrate can be applied to various display products, such as a liquid crystal display product and an organic light emitting diode display product.

In the opposite substrate provided by the embodiments of the present disclosure, the inner wall pattern and the outer wall pattern are at least partially staggered, to form a passage between the display region 10 and a side of the wall structure 33 distal to the display region 10, such that when the opposite substrate and the array substrate are aligned to form a display panel, the wall structure 33 is able to prevent the sealant from entering the display region 10; in addition, it also enables the liquid crystals in the display panel to fill the region between the sealant and the wall structure 33 via the passage, which prevents the formation of the vacuum region between the sealant and the wall, improves the reliability of the frame region of the display panel, and effectively improves the performance of the display panel.

Figure 3:
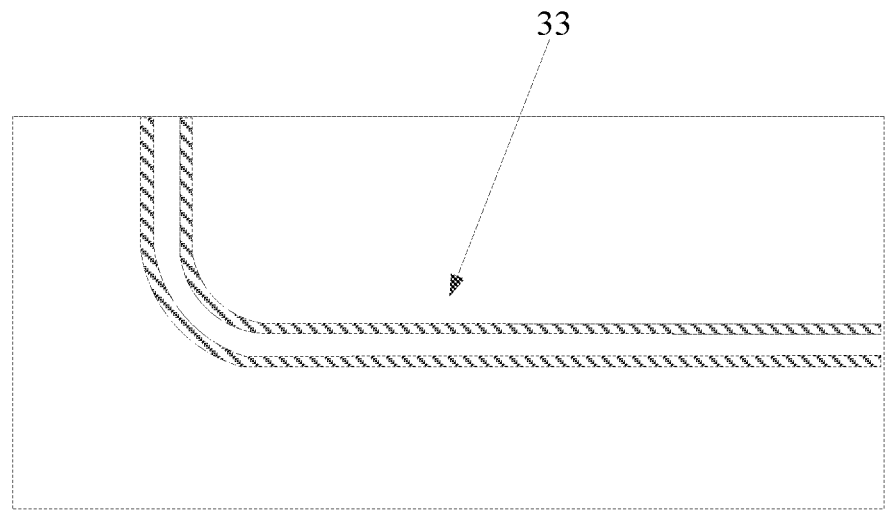
FIG. 3 is a schematic view of a portion of a wall structure in the related art.

It should be noted that, as shown in FIG. 3, in the wall structure of the related art, the liquid crystals cannot fill the region between the sealant and the wall structure 33.

As shown in FIGS. 4 and 5, in some embodiments of the present disclosure, the periphery region 20 includes a corner region and a straight region;

the inner wall pattern includes a first corner wall pattern 331 and a first straight wall pattern 332;

the outer wall pattern includes a second corner wall pattern 333 and a second straight wall pattern 334;

in at least one corner region, the first corner wall pattern 331 and the second corner wall pattern 333 are sequentially arranged in a direction away from the display region 10;

in at least one straight region, the first straight wall pattern 332 and the second straight wall pattern 334 are arranged alternately in an extension direction of the straight region.

For example, each corner region included in the periphery region 20 includes the first corner wall pattern 331 and the second corner wall pattern 333. For example, at the same corner region, the end of the first corner wall pattern 331 and the end of the second corner wall pattern 333 are aligned.

For example, in a straight region where the opposite substrate is proximate to the driving integrated circuit IC, the first straight wall pattern 332 and the second straight wall pattern 334 are arranged alternately in an extension direction of the straight region.

For example, the first straight wall pattern 332 and the second straight wall pattern 334 are not included in the straight regions of the opposite substrate other than the straight region near the driving integrated circuit (IC).

For example, among all straight regions of the opposite substrate, the first straight wall pattern 332 and the second straight wall pattern 334 are arranged alternately in an extension direction of the straight region.

According to the above configurations of the inner wall pattern and the outer wall pattern, when the opposite substrate and the array substrate are aligned to form a display panel, the wall structure 33 is able to prevent the sealant from entering the display region 10; in addition, it also enables the liquid crystals in the display panel to fill the region between the sealant and the wall structure 33 via the passage, which prevent the formation of the vacuum region between the sealant and the wall, facilitate the reliability of the display panel frame region, and effectively improve the performance of the display panel.

As shown in FIGS. 4 and 5, in some embodiments of the present disclosure, within the same straight region, the orthographic projection of the first straight wall pattern 332 in the first direction and the orthographic projection of the second straight wall pattern 334 in the first direction partially overlap, the first direction is parallel to the extension direction of the first straight wall pattern 332 and the extension direction of the second straight wall pattern 334.

The above-mentioned arrangement not only enables the wall structure 33 to further prevent the sealant from entering the display region 10 when the opposite substrate and the array substrate are aligned to form the display panel, but also enables the liquid crystals in the display panel to fill the region between the sealant and the wall structure 33 via the passage, which prevents the formation of the vacuum region between the sealant and the wall, facilitates the reliability of the frame region of the display panel, and effectively improve the performance of the display panel.

As shown in FIG. 5, in some embodiments of the present disclosure, in the same straight region, there is an overlapped portion of the orthographic projection of the first straight wall pattern 332 in the first direction and the orthographic projection of the second straight wall pattern 334 in the first direction, and a length a1 of the overlapped portion satisfies: 18 µm≤a1≤25 µm;

in an extension direction parallel to the first straight wall pattern 332, the length a2 of the first straight wall pattern 332 satisfies: 480 µm≤a2≤520 µm;

in an extension direction parallel to the second straight wall pattern 334, the length a2 of the second straight wall pattern 334 satisfies: 480 µm≤a3≤520 µm;

in an extension direction parallel to the first straight wall pattern 332, the distance a4 between the adjacent first straight wall pattern 332 satisfies: 440 µm≤a4≤480 µm;

in an extension direction parallel to the second straight edge wall pattern 334, the distance a5 between the adjacent second straight edge wall pattern 334 satisfies: 440 µm≤a5≤480 µm;

the minimum distance a6 between the first corner wall pattern 331 and the display region 10 satisfies: 50 µm≤a6≤350 µm;

in the direction perpendicular to the first direction, the distance a7 between the border of the first straight wall pattern 332 proximate to the display region 10 and the border of the second straight wall pattern 334 distal to the display region 10 satisfies: 40 µm≤a7≤60 µm;

in the same corner region, the extension direction of the first corner wall pattern 331 and the extension direction of the second corner wall pattern 333 are the same, and in the extension direction perpendicular to the first corner wall pattern 331, the distance a8 between the border of the first corner wall pattern 331 proximate to the display region 10 and the border of the second corner wall pattern 333 distal to the display region 10 satisfies: 40 µm≤a8≤60 µm;

the second corner wall pattern 333 is adjacent to the first straight region and the second straight region, the first end of the second corner wall pattern 333 is proximate to the first straight region, and the second end of the second corner wall pattern 333 is proximate to the second straight region; a distance a9 between the first end and the border of the second straight region distal to the display region 10 satisfies: 3 mm≤a9≤3.4 mm; the distance a10 between the second end and the first straight region distal to the border of the display region 10 satisfies: 2.8 mm a10≤3.2 mm.

For example, the first corner wall pattern 331, the second corner wall pattern 333, the first straight wall pattern 332, and the second straight wall pattern 334 are each formed in a structure that is wide near the bottom of the second base 30 and narrow distal to the top of the second base 30, which is similar to the structure of the spacer.

In the same straight region, there is an overlapped portion of the orthographic projection the bottom of the first straight wall pattern 332 in the first direction and the orthographic projection of the bottom of the second straight wall pattern 334 in the first direction, the length a1 of the overlapped portion satisfies: 18 µm≤a1≤20 µm.

In the same straight region, there is an overlapped portion of the orthographic projection the top of the first straight wall pattern 332 in the first direction and the orthographic projection of the top of the second straight wall pattern 334 in the first direction, the length a12 of the overlapped portion satisfies: 8 µm≤a11≤12 µm.

Arranging the a1 to a11 in the above-mentioned range effectively reduces the frame width of the display panel after the opposite substrate is used to form the display panel, which is beneficial to further improve the application range of the display panel.

As shown in FIGS. 1, 4 and 5, the embodiments of the present disclosure further provides a display panel, including an array substrate provided by the above-mentioned embodiments and an opposite substrate provided by the above-mentioned embodiments, wherein the array substrate is arranged opposite to the opposite substrate, and the display panel further includes:

a liquid crystal layer, the liquid crystal layer being arranged between the array substrate and the opposite substrate;

a sealant, the sealant bonding a periphery region 20 of the array substrate with a periphery region 20 of the opposite substrate, the sealant surrounding the wall structures 33 in the opposite substrate.

For example, the array substrate is arranged opposite to the opposite substrate, and all the structures of the array substrate and the opposite substrate are located between the first base 13 of the array substrate and the second base 30 of the opposite substrate.

For example, the orthographic projection of the sealant on the first base 13 surrounds the orthographic projection of the display region 10 of the array substrate on the first base 13.

For example, the wall structure 33 is arranged between the sealant and the display region 10.

In the array substrate provided by the above-mentioned embodiments, the segment gap layer 111 is arranged at the reflective region 11, and the thicknesses of the segment gap layer 111 may be controlled, so as to control the segment gap of the array substrate at the reflective region 11 and the transmissive region 12. When the array substrate and the opposite substrate are aligned to form the display panel provided by the embodiments of the present disclosure, it is possible to implement that the display panel has a significant difference between the cell thickness of the reflective region 11 and the cell thickness of the transmissive region 12, thereby enabling an optimal matching of the cell thickness of the display panel at the reflective region 11 and the cell thickness at the transmissive region 12, so that the display panel can achieve a high reflectivity, a high transmittance and a high contrast, which effectively enlarge the application range of the display panel with the transflective function.

Furthermore, in the array substrate provided by the above-mentioned embodiments, the thicknesses of the segment gap layer 111 is controlled, so as to control the segment gap of the array substrate in the reflective region 11 and the periphery region 20; and when the array substrate and the opposite substrate are aligned to form the display panel provided by the embodiment of the present disclosure, the cell thickness of the display panel in the periphery region 20 can be better controlled, so that the cell thickness of the display panel in the periphery region 20 can better match the supporting part (e.g., spherical silicon) arranged in the sealant in the periphery region 20 to prevent the defect of the moire pattern from occurring in the periphery region 20 in a better manner.

Further, in the opposite substrate provided by the above-mentioned embodiments, the inner wall pattern and the outer wall pattern are arranged to be at least partially staggered from each other, it forms a passage of the display region 10 and a side of the wall structure 33 distal to the display region 10, such that when the opposite substrate and the array substrate are aligned to form the display panel provided by the embodiments of the present disclosure, the wall structure 33 can not only prevent the sealant from entering the display region 10, but also enable the liquid crystals in the display panel to fill the region between the sealant and the wall structure 33 via the passage, which prevents the formation of a vacuum region between the sealant and the wall, facilitates the reliability of the display panel frame region, and effectively improves the performance of the display panel.

As shown in FIG. 1, in some embodiments of the present disclosure, in the reflective region 11, the distance d2 between the opposite substrate and the array substrate satisfies: 2 µm≤d2≤2.4 µm; in the transmissive region 12, the distance d3 between the opposite substrate and the array substrate satisfies: 4.4 µm≤d3≤µm.

For example, in the reflective region 11, the distance d2 between the opposite substrate and the array substrate includes 2.2 µm; in the transmissive region 12, the distance d3 between the opposite substrate and the array substrate includes 4.6 µm.

In the display panel provided by the above-mentioned embodiments, the difference between the cell thickness of the reflective region 11 and the cell thickness of the transmissive region 12 of the display panel can be controlled to be between 2 µm and 3 µm, such that the display panel has a significant difference between the cell thickness at the reflective region 11 and the cell thickness at the transmissive region 12, thereby enabling an optimal matching of the cell thickness of the display panel at the reflective region 11 and the cell thickness of the display panel at the transmissive region 12, so that the display panel can realize a high reflectivity, a high transmittance and a high contrast, which effectively expands the application range of the display panel with the transflective function.

As shown in FIG. 1, in some embodiments of the present disclosure, the display panel further includes a conductive connection part 50 and a supporting part, at least a portion of the conductive connection part 50 and at least a portion of the supporting part are provided in the sealant, the conductive connection part 50 is coupled to the common electrode 32 in the opposite substrate and the common signal outputting layer 201 in the array substrate, respectively.

For example, both the conductive connection part 50 and the supporting part are mixed within the sealant.

For example, the conductive connection part 50 includes spherical gold and the supporting part includes spherical silicon.

For example, the common electrode 32 in the opposite substrate is coupled to the common signal outputting layer 201 in the array substrate via the conductive connection part 50 to receive the signal of the common electrode 32 transmitted by the common signal outputting layer 201.

In some embodiments of the present disclosure, the distance between the common electrode 32 in the opposite substrate and the common signal outputting layer 201 in the array substrate is set to be greater than or equal to the size of the supporting part.

For example, the supporting part includes the spherical silicon, and the distance between the common electrode 32 in the opposite substrate and the common signal outputting layer 201 in the array substrate is greater than or equal to the size of the spherical silicon.

The above-mentioned arrangement enables the cell thickness of the display panel in the periphery region 20 to better match the supporting part arranged in the sealant in the periphery region 20 (e.g., the spherical silicon), to prevent the defect of the moire pattern from occurring in the periphery region 20 in a better manner.

In some embodiments of the present disclosure, the liquid crystal layer includes: cholesteric liquid crystals with an achiral agent;
a side of the array substrate proximate to the opposite substrate is provided with a first alignment layer, a side of the opposite substrate proximate to the array substrate is provided with a second alignment layer, and the alignment direction of the first alignment layer is anti-parallel to the alignment direction of the second alignment layer.

For example, the display panel employs an Electrically Controlled Birefringence (ECB) transflective display mode.

Through the above arrangement that the liquid crystal layer includes the cholesteric liquid crystals with the achiral agent and the alignment direction of the first alignment layer is anti-parallel to the alignment direction of the second alignment layer, it may solve the problem of light efficiency degradation due to the mismatch of the liquid crystal pitch and the cell thickness.

The embodiments of the present disclosure also provide a display device, including the display panel provided by the embodiments described above.

It should be noted that the display device may be any product or component with a display function, such as television, display, digital photo frame, mobile phone and tablet computer.

It should be noted that the "same layer" of the embodiments of the present disclosure may refer to the film layer arranged on the same structural layer. Alternatively, for example, the film layer in the same layer may be a layer structure formed by forming the film layer for forming a specific pattern using the same film-forming process and then patterning the film layer by a single patterning process using the same mask plate. Depending on the particular pattern, a single patterning process may includes multiple exposure, development, or etching processes, and the particular pattern in the formed layer structure may or may not be continuous. These particular patterns may also be at different heights or have different thicknesses.

In the method embodiments of the present disclosure, the sequence number of each step cannot be used to define the sequence of each step, and for a person of ordinary skill in the art, the sequence of each step is also within the protected range of the present disclosure without involving any inventive effort.

It should be noted that each embodiment in the present description is described in a progressive manner, the same and similar parts between the embodiments can be referred to each other, and each embodiment focuses on the differences from other embodiment. In particular, with regard to the method embodiments, since it is substantially similar to the product embodiment, the description thereof is relatively simple, and reference can be made to partial description of the product embodiment for the relevant part.

Unless defined otherwise, technical or scientific terms used in the present disclosure shall have the ordinary meaning as understood by one of ordinary skill in the art to which this disclosure belongs. The use of "first", "second", and the like in this disclosure does not denote any order, quantity, or importance, but rather is used to distinguish one element from another. The word "including" or "includes", and the like, means that the presence of an element or item preceding the word covers the presence of the element or item listed after the word and equivalents thereof, but does not exclude other elements or items. The terms "linked", "coupled", or "connected", and the like, are not limited to physical or mechanical connections, but may include electrical connections, whether direct or indirect. The terms "upper", "lower", "left", "right", etc. are used only to indicate a relative position relationship, which may change accordingly when the absolute position of the object being described changes.

It will be understood that when an element such as a layer, film, region, or substrate is referred to as being "on" or "under" another element, it can be "directly on" or "directly under" the other element or an intervening element may be present.

In the above description of embodiment, particular features, structures, material or characteristics may be combined in any suitable manner in any one or more of the embodiments or examples.

The above are only specific embodiments of the present disclosure, but the protection scope of the present disclosure is not limited thereto, and any person skilled in the art would have readily conceived of changes or substitutions within the technical scope disclosed in the present disclosure, and all of these should be covered by the protection scope of the present disclosure. Accordingly, the protection scope of the present disclosure shall be defined by the protection scope of the claims.

What is claimed is:

1. An opposite substrate comprising: a display region and a periphery region surrounding the display region, wherein the opposite substrate further comprises a second base, a color resist layer, a common electrode, and a wall structure, wherein the color resist layer, the common electrode, and the wall structure are arranged on the second base;

wherein both the color resist layer and the common electrode are extending from the display region to the periphery region; and the wall structure is arranged in the periphery region, and the wall structure comprises an inner wall pattern and an outer wall pattern, the inner wall pattern is arranged between the display region and the outer wall pattern, the inner wall pattern and the outer wall pattern are at least partially staggered to form a passage from the display region to a side of the wall structure distal to the display region;

wherein the periphery region comprises a corner region and a straight region;

the inner wall pattern comprises a first corner wall pattern and a first straight wall pattern;

the outer wall pattern comprises a second corner wall pattern and a second straight wall pattern; and in at least one straight region, the first straight wall pattern and the second straight wall pattern are arranged alternately in an extension direction of the straight region;

wherein in a same straight region, an orthographic projection of the first straight wall pattern in a first direction partially overlaps an orthographic projection of the second straight wall pattern in the first direction, and the first direction is parallel to an extension direction of the first straight wall pattern and an extension direction of the second straight wall pattern;

wherein in the same straight region, there is an overlapped portion of the orthographic projection of the first straight wall pattern in the first direction and the orthographic projection of the second straight wall pattern in the first direction, and a length a1 of the overlapped portion satisfies: 18 µm≤a1≤25 µm;

in an extension direction parallel to the first straight wall pattern, a length a3 of the second straight wall pattern satisfies: 480 µm≤a2≤520 µm;

in an extension direction parallel to the second straight wall pattern, a length a2 of the second straight wall pattern satisfies: 480 µm≤a3≤520 µm;

in an extension direction parallel to the first straight wall pattern, a distance a4 between the adjacent first straight wall patterns satisfies: 440 µm≤a4≤480 µm;

in an extension direction parallel to the second straight wall pattern, a distance a5 between the adjacent second straight wall patterns satisfies: 440 µm≤a5≤480 µm;

a minimum distance a6 between the first corner wall pattern and the display region satisfies: 50 µm≤a6≤350 µm;

in a direction perpendicular to the first direction, a distance a7 between a border of the first straight wall pattern proximate to the display region and a border of the second straight wall pattern distal to the display region satisfies: 40 µm≤a7≤60 µm;

in a same corner region, an extension direction of the first corner wall pattern and an extension direction of the second corner wall pattern are same; and in an extension direction perpendicular to the first corner wall pattern, a distance a8 between a border of the first corner wall pattern proximate to the display region and a border of the second corner wall pattern distal to the display region satisfies: 40 µm≤a8≤60 µm; and the second corner wall pattern is adjacent to the first straight region and the second straight region, a first end of the second corner wall pattern is proximate to the first straight region, and a second end of the second corner wall pattern is proximate to the second straight region; a distance a9 between the first end and a border of the second straight region distal to the display region satisfies: 3 mm≤a9≤3.4 mm; a distance a10 between the second end and the first straight region distal to a border of the display region satisfies: 2.8 mm≤a10≤3.2 mm.

2. A display panel comprising an array substrate and the opposite substrate according to claim 1, wherein the array substrate comprises: a display region and a periphery region surrounding the display region, wherein the display region comprises a plurality of pixel regions, and each of the pixel regions comprises a reflective region and a transmissive region;

the reflective region comprises: a driving signal outputting layer, a segment gap layer, a passivation layer and a reflective layer laminated sequentially on a first base in a direction away from the first base, the reflective layer is coupled to the driving signal outputting layer to enable both the reflective layer and the driving signal outputting layer to function as a reflective region driving electrode;

the transmissive region comprises a first electrode layer, the first electrode layer is coupled to the driving signal outputting layer, the passivation layer extends to the transmissive region, and the passivation layer is arranged between the first electrode layer and the first base;

the array substrate is arranged opposite to the opposite substrate, wherein the display panel further comprises:

a liquid crystal layer arranged between the array substrate and the opposite substrate; and a sealant configured for bonding the periphery region of the array substrate with the periphery region of the opposite substrate, wherein the sealant surrounds the wall structure in the opposite substrate.

3. The display panel according to claim 2, wherein in the reflective region, a distance d2 between the opposite substrate and the array substrate satisfies: 2 μm≤d2≤2.4 μm; and in the transmissive region, a distance d3 between the opposite substrate and the array substrate satisfies: 4.4 μm≤d3≤5 μm.

4. The display panel according to claim 3, wherein the display panel further comprises a conductive connection part and a supporting part, at least a portion of the conductive connection part and at least a portion of the supporting part are both within the sealant, and the conductive connection part are coupled to both the common electrode in the opposite substrate and the common signal outputting layer in the array substrate.

5. The display panel according to claim 4, wherein a distance between the common electrode in the opposite substrate and the common signal outputting layer in the array substrate is greater than or equal to a size of the supporting part.

6. The display panel according to claim 2, wherein the liquid crystal layer comprises cholesteric liquid crystals with an achiral agent; and a side of the array substrate proximate to the opposite substrate is provided with a first alignment layer, a side of the opposite substrate proximate to the array substrate is provided with a second alignment layer, and an alignment direction of the first alignment layer is anti-parallel to an alignment direction of the second alignment layer.

7. The display panel according to claim 2, wherein there is a maximum segment gap d1 between a surface of the reflective layer distal to the first base and a surface of a portion of the first electrode layer distal to the first base, and the portion of the first electrode layer is arranged at the transmissive region, where 2 μm≤d1≤3 μm.

8. The display panel according to claim 2, wherein the segment gap layer comprises a buffer layer and an Over-Coating (OC) layer, and the buffer layer is arranged between the OC layer and the first base.

9. The display panel according to claim 2, wherein the array substrate further comprises a driving electrode arranged in the reflective region, and the reflective layer further functions as the driving electrode.

10. The display panel according to claim 2, wherein the reflective region further comprises a gate metal layer, a gate insulation layer and an active layer; the gate metal layer, the gate insulation layer and the active layer are laminated on one on another in a direction away from the first base, the driving signal outputting layer is arranged at a side of the active layer distal to the first base; the gate metal layer, the gate insulation layer, the active layer and the driving signal outputting layer are capable of forming a thin-film transistor, the driving signal outputting layer functions as an output electrode of the thin-film transistor;

the gate insulation layer extends to the transmissive region and the periphery region; the passivation layer extends to the periphery region.

11. The display panel according to claim 10, wherein the periphery region comprises:

a common signal outputting layer and a common signal transmission layer that are coupled to each other;

the common signal outputting layer is arranged at a side of the passivation layer distal to the first base, and the common signal transmission layer is arranged between the passivation layer and the first base.

12. The display panel according to claim 11, wherein the common signal outputting layer and the first electrode layer are arranged at a same layer and made of a same material, and the common signal transmission layer and the gate metal layer are arranged at a same layer and made of a same material.

* * * * *